United States Patent
Wu et al.

(10) Patent No.: US 11,089,506 B2
(45) Date of Patent: Aug. 10, 2021

(54) INFORMATION TRANSMISSION METHOD AND APPARATUS AND SYSTEM

(71) Applicant: FUJITSU LIMITED, Kawasaki (JP)

(72) Inventors: Lianhai Wu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/017,499

(22) Filed: Jun. 25, 2018

(65) Prior Publication Data
US 2018/0317124 A1 Nov. 1, 2018

Related U.S. Application Data

(63) Continuation of application No. PCT/CN2016/070160, filed on Jan. 5, 2016.

(51) Int. Cl.
*H04W 28/02* (2009.01)
*H04W 4/46* (2018.01)
(Continued)

(52) U.S. Cl.
CPC ......... *H04W 28/0289* (2013.01); *H04L 47/11* (2013.01); *H04L 47/76* (2013.01);
(Continued)

(58) Field of Classification Search
CPC ... H04W 28/0289; H04W 4/46; H04W 28/06; H04W 28/08; H04W 88/02; H04W 36/22; H04W 40/04; H04W 48/06; H04W 72/048; H04L 47/11; H04L 47/76; H04L 47/125; H04L 29/08567; H04B 1/38; H04M 1/00
See application file for complete search history.

(56) References Cited

U.S. PATENT DOCUMENTS 6,144,636 A * 11/2000 Aimoto .................. H04L 47/10
370/229
6,633,541 B1 * 10/2003 Hijikata ............. H04Q 11/0062
370/231
(Continued)

FOREIGN PATENT DOCUMENTS

| CN | 104159254 A | 11/2014 |
| CN | 104754641 A | 7/2015 |
| CN | 104836743 A | 8/2015 |

OTHER PUBLICATIONS

International Search Report issued for corresponding International Patent Application No. PCT/CN2016/070160, dated Sep. 30, 2016, with an English translation.
(Continued)

*Primary Examiner* — Jenee Holland
(74) *Attorney, Agent, or Firm* — Myers Wolin, LLC (57) ABSTRACT

Embodiments of this disclosure provide an information transmission method and apparatus and a system. The method is applicable to a terminal and includes: whether the terminal is in a congestion state is determined; and corresponding information is transmitted by using a parameter related to the congestion state when the terminal is in a congestion state. With the embodiments of this disclosure, the parameter related to the congestion state is configured for the terminal, thereby reducing resource collision, improving resource utilization efficiency and improving reliability of communications.

16 Claims, 5 Drawing Sheets

(51) Int. Cl.
- *H04L 12/801* (2013.01)
- *H04L 12/917* (2013.01)
- *H04W 28/06* (2009.01)
- *H04W 28/08* (2009.01)
- *H04W 48/06* (2009.01)
- *H04W 74/00* (2009.01)
- *H04W 8/22* (2009.01)
- *H04W 88/02* (2009.01)

(52) U.S. Cl.
CPC ............ *H04W 4/46* (2018.02); *H04W 28/06* (2013.01); *H04W 28/08* (2013.01); *H04W 8/22* (2013.01); *H04W 48/06* (2013.01); *H04W 74/006* (2013.01); *H04W 88/02* (2013.01)

(56) References Cited

U.S. PATENT DOCUMENTS

| | | | | |
|---|---|---|---|---|
| 6,643,256 | B1* | 11/2003 | Shimojo | H04L 12/5601 370/229 |
| 2003/0072260 | A1* | 4/2003 | Janoska | H04L 47/10 370/229 |
| 2003/0103459 | A1* | 6/2003 | Connors | H04L 1/1614 370/235 |
| 2003/0114167 | A1* | 6/2003 | Chen | H04W 28/10 455/453 |
| 2003/0225903 | A1* | 12/2003 | Lodha | H04L 41/0896 709/232 |
| 2004/0015602 | A1* | 1/2004 | Goldhammer | H04L 47/10 709/235 |
| 2004/0081090 | A1* | 4/2004 | Hara | H04L 47/10 370/229 |
| 2004/0170123 | A1* | 9/2004 | Carpenter | H04L 63/1458 370/229 |
| 2004/0170127 | A1* | 9/2004 | Tanaka | H04L 47/10 370/235 |
| 2005/0036511 | A1* | 2/2005 | Baratakke | H04L 29/06 370/469 |
| 2005/0180415 | A1* | 8/2005 | Cheung | H04L 1/0006 370/389 |
| 2007/0053352 | A1* | 3/2007 | Corcoran | H04B 3/54 370/389 |
| 2008/0056182 | A1* | 3/2008 | Usuda | H04L 1/0007 370/329 |
| 2008/0175146 | A1* | 7/2008 | Van Leekwuck | H04L 47/10 370/230 |
| 2008/0198746 | A1* | 8/2008 | Kwan | H04L 47/10 370/231 |
| 2010/0158000 | A1* | 6/2010 | Muramoto | H04L 12/1827 370/390 |
| 2010/0165846 | A1* | 7/2010 | Yamaguchi | H04B 7/15592 370/236 |
| 2011/0026494 | A1* | 2/2011 | Nagasawa | H04W 36/02 370/332 |
| 2011/0122871 | A1* | 5/2011 | Shenoi | H04J 3/0641 370/389 |
| 2012/0051222 | A1* | 3/2012 | Ogura | H04L 47/245 370/237 |
| 2012/0063493 | A1* | 3/2012 | Hasegawa | H04L 47/263 375/211 |
| 2012/0147748 | A1* | 6/2012 | Sato | H04L 47/12 370/235 |
| 2012/0226802 | A1* | 9/2012 | Wu | H04L 1/1825 709/224 |
| 2013/0148507 | A1* | 6/2013 | Wen | H04W 24/00 370/237 |
| 2014/0177429 | A1 | 6/2014 | Patil et al. | |
| 2015/0023168 | A1* | 1/2015 | Kotecha | H04W 28/0289 370/232 |
| 2017/0013533 | A1* | 1/2017 | Felemban | H04W 4/70 |

OTHER PUBLICATIONS

Written Opinion of the International Searching Authority issued for corresponding International Patent Application No. PCT/CN2016/070160, dated Sep. 30, 2016, with an English translation.

First Notification of Office Action and Search Report issued by the China National Intellectual Property Administration for corresponding Chinese patent application No. 201680072285.7, dated Nov. 3, 2020, with an English translation.

Second Notification of Office Action issued by the China National Intellectual Property Administration for corresponding Chinese Patent Application No. 201680072285.7, dated Jun. 2, 2021, with an English translation.

* cited by examiner

INFORMATION TRANSMISSION METHOD AND APPARATUS AND SYSTEM

CROSS REFERENCE TO RELATED APPLICATIONS

This application is a continuation application of International Application PCT/CN2016/070160 filed on Jan. 5, 2016, the entire contents of which are incorporated herein by reference.

FIELD

This disclosure relates to the field of communications technologies, and in particular to an information transmission method and apparatus and a system.

BACKGROUND

Figure 1:
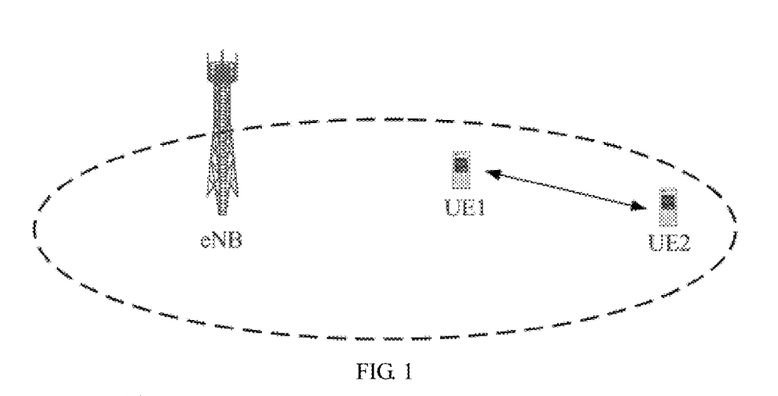
FIG. 1 is a schematic diagram of a scenario of the sidelink communications.
Figure 2:
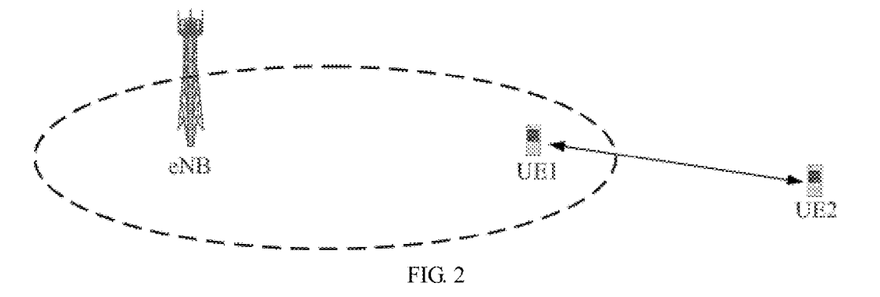
FIG. 2 is schematic diagram of another scenario of the sidelink communications.
Figure 3:
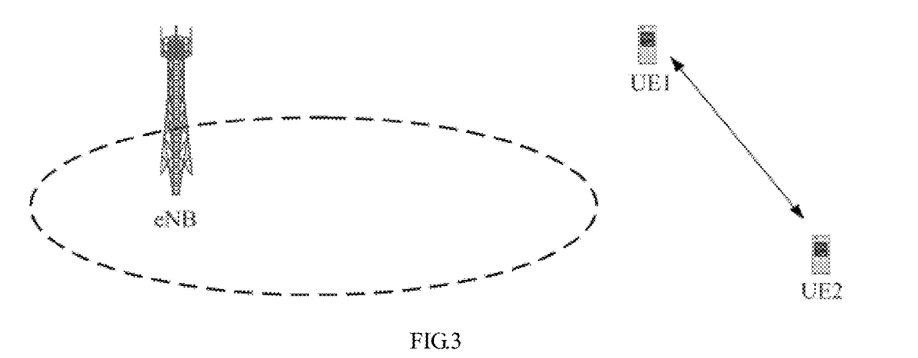
FIG. 3 is a schematic diagram of a further scenario of the sidelink communications.

A sidelink communications mode refers to that a packet needs not to pass a core network and an eNB, and a communications link may be directly established between UE1 and UE2 for communications. A sidelink discovery process is generally performed before performing sidelink communications. For example, UE2 needs first to discover whether UE1 is near before transmitting information to UE1 in the sidelink communications mode. FIG. 1 is a schematic diagram of discovering or establishing the sidelink communications, in which a case where two UEs (UE1 and UE2) under coverage of an eNB is shown. FIG. 2 is another schematic diagram of discovering or establishing the sidelink communications, in which a case where one UE (UE1) under coverage of an eNB and another UE (UE2) not under the coverage of the eNB is shown. And FIG. 3 is a further schematic diagram of discovering or establishing the sidelink communications, in which a case where two UEs (UE1 and UE2) not under coverage of an eNB is shown.

Figure 4:
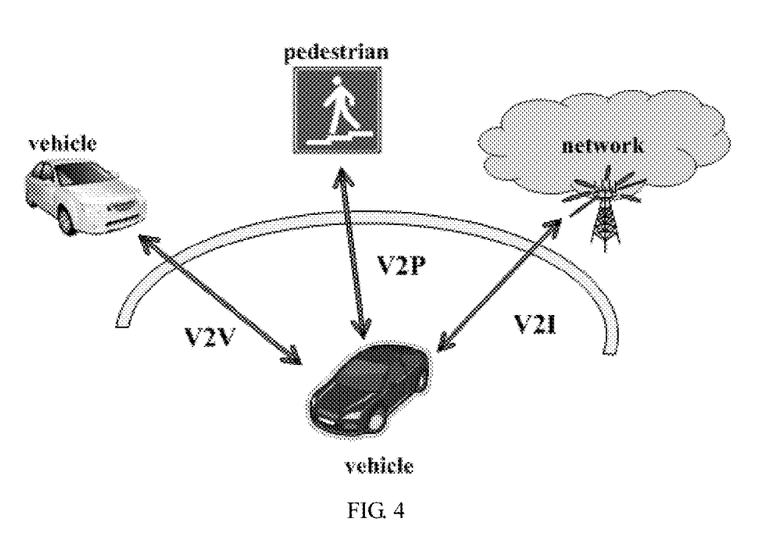
FIG. 4 is a schematic diagram of a scenario of the V2X.

V2X (vehicle-to-everything) communications is one of sidelink communications modes, which includes three types of communications modes: V2V (vehicle-to-vehicle) communications, V2I (vehicle-to-infrastructure) communications and V2P (vehicle-to-pedestrian) communications. FIG. 4 is a schematic diagram of these three types of communications modes. In a V2V scenario, two terminals with a relatively short distance therebetween may transmit information on V2V after being authorized by an E-UTRAN (evolved UNTS terrestrial radio access network). The information on V2V may include information on a location, and a terminal attribute, etc. A size of the information on V2V may also be variable. Transmission of the information on V2V may be performed in a direct manner, that is, it may be transmitted by no infrastructure; or, it may be transmitted via an infrastructure, such as an RSU (road side unit).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Figure 5:
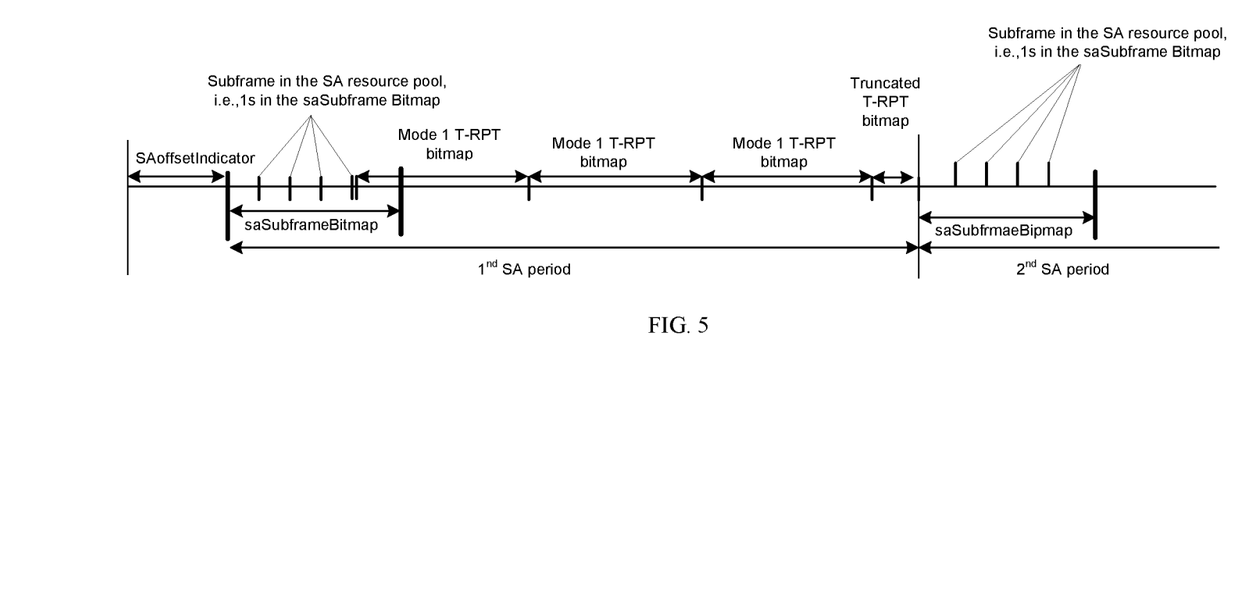
FIG. 5 is a schematic diagram of a resource pool used for sidelink direct communications.

It was found by the inventors that before performing sidelink transmission, a terminal will be configured with some resource pools. A scheduling assignment (SA) resource pool in the resource pools is used for transmitting Physical Sidelink Control CHannels (PSCCHs). The PSCCHs may carry sidelink control information (SCI) format 0 information. According to existing protocols, the SCI format 0 information will be transmitted repeatedly twice at two different subframes in the SA resource pool, as shown in FIG. 5. In the scenario shown in FIG. 5, the control information and the data are located in different subframe resources; however, the control information and the data may also be located in the same subframe for transmission. Taking scenarios of high traffic density into account, providing a full low-latency capacity poses a challenge to the system. Hence, a solution of resource control needs to be designed to avoid congestion.

In order to solve the above problem, embodiments of this disclosure provide an information transmission method and apparatus and a system.

According to a first aspect of the embodiments of this disclosure, there is provided an information transmission apparatus, applicable to a terminal; wherein, the apparatus includes:

a determining unit configured to determine whether the terminal is in a congestion state; and a transmitting unit configured to transmit corresponding information by using a parameter related to the congestion state when the terminal is in a congestion state.

According to a second aspect of the embodiments of this disclosure, there is provided a terminal device, including the information transmission apparatus as described in the first aspect.

According to a third aspect of the embodiments of this disclosure, there is provided an information transmission method, applicable to a terminal; wherein, the method includes:

determining whether the terminal is in a congestion state; and transmitting corresponding information by using a parameter related to the congestion state when the terminal is in a congestion state.

According to a fourth aspect of the embodiments of this disclosure, there is provided a communications system, including a transmitter and a receiver, wherein, the transmitter is configured to determine whether the transmitter is in a congestion state, and transmit corresponding information by using a parameter related to the congestion state when the transmitter is in a congestion state.

An advantage of the embodiments of this disclosure exists in that with the embodiments of this disclosure, the parameter related to the congestion state is configured for the terminal, thereby reducing resource collision, improving resource utilization efficiency and improving reliability of communications.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings, and these embodiments are illustrative only, and are not intended to limit this disclosure.

Embodiment 1

Figure 6:
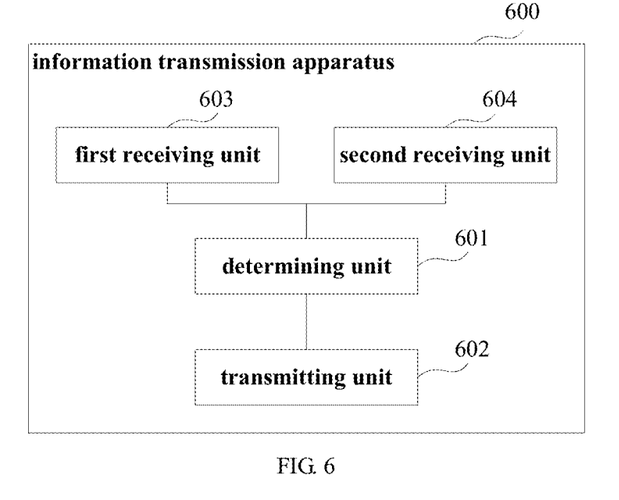
FIG. 6 is a schematic diagram of a structure of the information transmission apparatus of an embodiment of this disclosure.

The embodiment of this disclosure provides an information transmission apparatus, applicable to a terminal, such as UE1 or UE2 in the scenarios shown in FIGS. 1-3, UE1 and UE2 may be vehicles in the scenario shown in FIG. 4. FIG. 6 is a schematic diagram of a structure of the apparatus. Referring to FIG. 6, an information transmission apparatus 600 includes a determining unit 601 and a transmitting unit 602.

In this embodiment, the determining unit 601 is configured to determine whether the terminal is in a congestion state. And the transmitting unit 602 transmits corresponding information by using a parameter related to the congestion state when the terminal is in a congestion state.

In this embodiment, the terminal is configured with a resource pool for transmitting the information. In one implementation, the terminal is configured with a common set of resource pools, and resources are selected from the common set of resource pools for transmitting all information. And in another implementation, the terminal is configured with multiple resource pools, each resource pool being associated with one type of information, and resources being selected only from an associated resource pool for transmitting different types of information.

In the scenario of V2V communications shown in FIG. 4, the terminal in this embodiment refers to a vehicle performing V2V communications, and the information in this embodiment refers to V2V-related information. In such a scenario, the V2V-related information includes two types: emergency information and non-emergency information. The emergency information mainly includes alarm information for avoiding vehicle accidents. From a point of view of priorities, the V2V-related information may be classified into a number of priorities according to importance, such as a high priority, an intermediate priority and low priority. The alarm information for avoiding vehicle accidents is generally of a high priority. In this embodiment, for the sake of simplicity, the information of a non-high priority is referred to as a first type of information, and the information of a high priority is referred to as a second type of information. It should be noted that the above definitions are given by taking a V2V communications scenario as an example, and it may be understood by those skilled in the art that in other scenarios, the first type of information and the second type of information may be redefined as needed, and this embodiment is not limited thereto.

In this embodiment, for a terminal under coverage of a base station, such as UE1 and UE2 in the scenario shown in FIG. 1 or UE1 in the scenario shown in FIG. 2, the above resource pool may be configured via radio resource control (RRC) signaling, and for a terminal out of the coverage of the base station, such as UE2 in the scenario shown in FIG. 2 or UE1 and UE2 in the scenario shown in FIG. 3, the above resource pool may be configured in advance, and a particular manner of configuration is not limited in this embodiment.

In this embodiment, for the terminal under coverage of the base station, in one implementation, the above determining unit 601 determines whether the terminal is in a congestion state according to whether the parameter related to the congestion state is received. As shown in FIG. 6, the apparatus 600 may further include a first receiving unit 603 configured to receive the parameter related to the congestion state. In this implementation, the terminal is triggered in an implicitly triggering manner to use the parameter related to the congestion state, that is, once the parameter related to the congestion state is configured for the terminal, it implicitly indicates the terminal is in the congestion state. After the terminal receives the above parameter related to the congestion state via the first receiving unit 603, it may be acknowledged that the terminal is in the congestion state.

In this embodiment, for the terminal under coverage of the base station, in another implementation, the above determining unit 601 determines whether the terminal is in a congestion state according to received congestion state indication information. As shown in FIG. 6, the apparatus 600 may further include a second receiving unit 604 configured to receive congestion state indication information. In this implementation, the terminal is triggered in an explicitly triggering manner to use the parameter related to the congestion state. In this implementation, the terminal is preconfigured with the parameter related to the congestion state, and alternatively, an indication parameter indicating whether the terminal is in a congestion state may also be configured at the same time, such as being configured as NO by default. When the base station discovers that the terminal is in a congestion state, it may notify the terminal to use the parameter related to the congestion state by transmitting the above congestion state indication information to the terminal. Hence, after receiving the congestion state indication information, the terminal may be acknowledged whether the terminal is in the congestion state. A form and transmission manner of the congestion state indication information are not limited in this embodiment, and furthermore, a manner of configuring the parameter related to the congestion state is also not limited in this embodiment.

In this embodiment, for the terminal out of the coverage of the base station, the determining unit 601 may determine whether the terminal is in a congestion state by detecting a resource utilization rate. For example, if the resource utilization rate is greater than a preconfigured resource utilization rate threshold, it may be acknowledged that the terminal is in a congestion state, and the parameter related to the congestion state may be used; otherwise, it may be acknowledged that the terminal is not in a congestion state, and the parameter related to the congestion state is not used. In this implementation, the terminal is preconfigured with the parameter related to the congestion state, and a manner of configuration is not limited in this embodiment. Furthermore, judging whether the terminal is in a congestion state by detecting a resource utilization rate is illustrative only, and this embodiment is not limited thereto; for example, whether the terminal is in a congestion state may also be judged by detecting a collision probability.

In this embodiment, when the terminal is in a congestion state, the transmitting unit 602 may transmit corresponding information by using the parameter related to the congestion state. When transmitting the corresponding information, a transmission resource may be selected from a corresponding resource pool. For example, if the terminal is configured with the above common set of resource pools, the transmitting unit 602 may select a transmission resource from the common set of resource pools. And for another example, if the terminal is configured with the above multiple resource pools associated with different types of information, the transmitting unit 602 may select a transmission resource from a resource pool to which the above corresponding information corresponds.

The parameter related to the congestion state shall be described below respectively by way of three implementations.

In one implementation, the parameter related to the congestion state is a maximum number of times of transmission of first type of information. In this implementation, the transmitting unit 602 is limited to the maximum number of times of transmission in transmitting the first type of information within a time period, and is not limited to the maximum number of times of transmission in transmitting other types of information within a time period. Taking that the first type of information is information of a non-high priority as an example, in this implementation, a maximum number of times of transmission is configured for the number of times of transmission of the information of a non-high priority, and within a time period, the number of times of transmission of the information of a non-high priority by the terminal should not exceed this value, and information of a high priority is not limited to this value.

In another implementation, the parameter related to the congestion state is a maximum number of times of transmission of all information. In this implementation, the transmitting unit 602 is not limited to the maximum number of times of transmission in transmitting second type of information within a time period, and is limited to the maximum number of times of transmission in transmitting other types of information within a time period. Taking that the second type of information is emergency information as an example, in this implementation, a maximum number of times of transmission is configured for the number of times of transmission of all information, and within a time period, the number of times of transmission of the information by the terminal should not exceed this value. And once the value is exceeded, within the time period, information of a non-high priority shall not be transmitted any longer, and information of a high priority is not limited to this value, and may be continued to be transmitted.

In a further implementation, the parameter related to the congestion state is different maximum numbers of times of transmission corresponding to different types of information. In this implementation, the transmitting unit 602 is limited to the maximum numbers of times of transmission to which the different types of information correspond in transmitting different types of information within a time period. Taking that the information is classified into a high priority, an intermediate priority and low priority as an example, in this implementation, a maximum number of times of transmission is configured for information of each priority. For example, n1 corresponds to information of a high priority, n2 corresponds to information of an intermediate priority, and n3 corresponds to information of a low priority. Within a time period, the number of times of transmission of information of each priority should not exceed a respective maximum number of times of transmission.

With the apparatus of this disclosure, the parameter related to the congestion state is configured for the terminal, thereby reducing resource collision, improving resource utilization efficiency and improving reliability of communications.

Embodiment 2

The embodiment of this disclosure provides a terminal device, such as UE1 or UE2 in the scenarios shown in FIGS. 1-3, UE1 and UE2 may be vehicles in the scenario shown in FIG. 4.

In this embodiment, the terminal device includes the information transmission apparatus as described in Embodiment 1.

Figure 7:
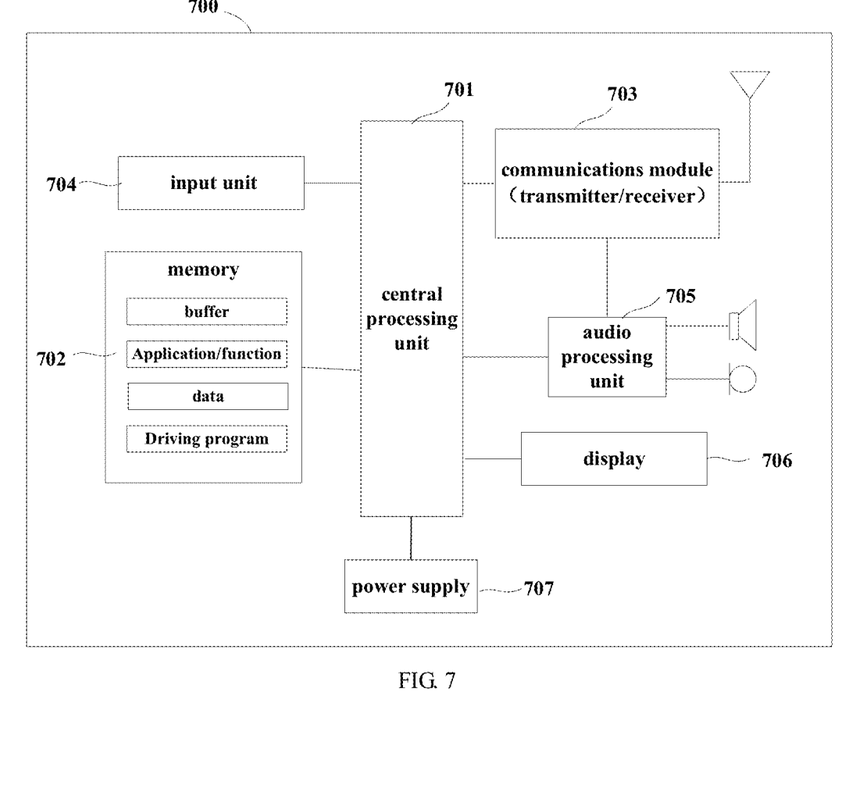
FIG. 7 is a schematic diagram of a hardware structure of the terminal device of an embodiment of this disclosure.

FIG. 7 is a schematic diagram of a structure of the terminal device of the embodiment of this disclosure. As shown in FIG. 7, a terminal device 700 may include a central processing unit 701 and a memory 702, the memory 702 being coupled to the central processing unit 701. It should be noted that this figure is illustrative only, and other types of structures may also be used, so as to supplement or replace this structure and achieve a telecommunications function or other functions.

In one implementation, the functions of the information transmission apparatus may be integrated into the central processing unit 701, and the central processing unit 701 carries out the functions of the information transmission apparatus as described in Embodiment 1. In this implementation, the functions of the information transmission apparatus are incorporated herein, which shall not be described herein any further.

In another implementation, the information transmission apparatus and the central processing unit 701 may be configured separately. For example, the information transmission apparatus may be configured as a chip connected to the central processing unit 701, with its functions being realized under control of the central processing unit 701.

As shown in FIG. 7, the terminal device 700 may further include a communications module 703, an input unit 704, an audio processing unit 705, a display 706 and a power supply 707. It should be noted that the terminal device 700 does not necessarily include all the parts shown in FIG. 7, and furthermore, the terminal device 700 may include parts not shown in FIG. 7, and the related art may be referred to.

As shown in FIG. 7, the central processing unit 701 is sometimes referred to as a controller or control, which may include a microprocessor or other processor devices and/or logic devices, and the central processing unit 701 receives input and controls operations of every component of the terminal device 700.

In this embodiment, the memory 702 may be, for example, one or more of a buffer memory, a flash memory, a hard drive, a mobile medium, a volatile memory, a nonvolatile memory, or other suitable devices, which may store various information, and furthermore, store programs executing related information. And the central processing unit 701 may execute programs stored in the memory 702, so as to realize information storage or processing, etc. Functions of other parts are similar to those of the related art, which shall not be described herein any further. The parts of the terminal device 700 may be realized by specific hardware, firmware, software, or any combination thereof, without departing from the scope of the present disclosure.

With the terminal device of this disclosure, the parameter related to the congestion state is configured for the terminal, thereby reducing resource collision, improving resource utilization efficiency and improving reliability of communications.

Embodiment 3

Figure 8:
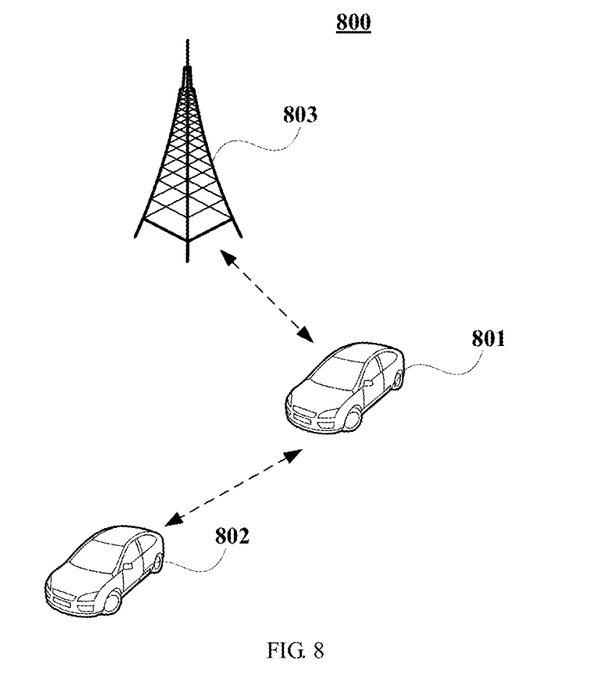
FIG. 8 is a schematic diagram of the communications system of an embodiment of this disclosure.

The embodiment of this disclosure provides a communications system. FIG. 8 is a schematic diagram of a structure of the communications system. As shown in FIG. 8, a communications system 800 includes a transmitter 801 and a receiver 802.

In this embodiment, the transmitter 801 is configured to determine whether the transmitter 801 is in a congestion state, and transmit corresponding information by using a parameter related to the congestion state when the transmitter 801 is in a congestion state. In this embodiment, the transmitter 801 may be implemented by the terminal device described in Embodiment 2, the contents of which being incorporated herein, which shall not be described herein any further.

In this embodiment, after receiving the above information, the receiver 802 makes a response according to an attribute of the information. For example, when the above information is emergency information, it makes a corresponding response according to the emergency information, and when the above information is non-emergency information, it may take the non-emergency information as a reference, which shall not be described herein any further.

In another embodiment, the receiver 802 functions as a transmitter of information, and may also be configured to determine whether the receiver 802 is in a congestion state, and transmit corresponding information by using a parameter related to the congestion state when the receiver 802 is in a congestion state. In this embodiment, the receiver 802 may also be implemented by the terminal device described in Embodiment 2, the contents of which being incorporated herein, which shall not be described herein any further.

In one implementation, as shown in FIG. 8, the communications system 800 further includes a base station 803 configured to configure the transmitter 801 and/or the receiver 802 with the above information related to a congestion state. As the information related to a congestion state has been described in Embodiment 1, its contents are incorporated herein, and shall not be described herein any further.

With the communications system of this embodiment, the parameter related to the congestion state is configured for the terminal, thereby reducing resource collision, improving resource utilization efficiency and improving reliability of communications.

Embodiment 4

The embodiment of this disclosure provides an information transmission method, applicable to a terminal, such as UE1 or UE2 in the scenarios shown in FIGS. 1-3, UE1 and UE2 may be vehicles in the scenario shown in FIG. 4. As principles of the method are similar to that of the apparatus in Embodiment 1, the implementation of the apparatus in Embodiment 1 may be referred to for implementation of the method, with identical contents being going to be described herein any further.

Figure 9:
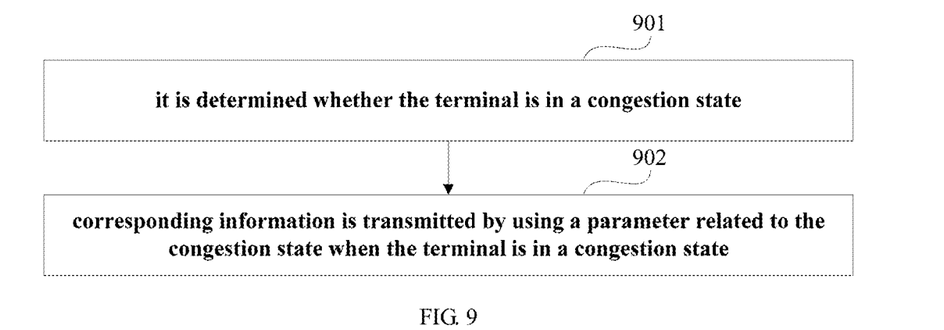
FIG. 9 is a flowchart of the information transmission method of an embodiment of this disclosure.

FIG. 9 is a flowchart of the method. As shown in FIG. 9, the method includes:

step 901: it is determined whether the terminal is in a congestion state; and step 902: corresponding information is transmitted by using a parameter related to the congestion state when the terminal is in a congestion state.

In this embodiment, the terminal is configured with a common set of resource pools for transmitting the information, or the terminal is configured with multiple resource pools associated with different types of information.

In one implementation of this embodiment, the parameter related to the congestion state is a maximum number of times of transmission of first type of information, and step 902 includes: transmission of the first type of information within a time period is limited to the maximum number of times of transmission, and transmission of other types of information within a time period is not limited to the maximum number of times of transmission.

In another implementation of this embodiment, the parameter related to the congestion state is a maximum number of times of transmission of all V2V information, and step 902 includes: transmission of second type of information within a time period is not limited to the maximum number of times of transmission, and transmission of other types of information within a time period is limited to the maximum number of times of transmission.

In a further implementation of this embodiment, the parameter related to the congestion state is different maximum numbers of times of transmission corresponding to different types of information, and step 902 includes: transmission of different types of information within a time period is limited to the maximum numbers of times of transmission to which the different types of information corresponds.

In this embodiment, if the terminal is located within coverage of a base station, in one implementation of step 901, whether the terminal is in a congestion state may be determined according to whether the parameter related to the congestion state is received. In this implementation, the terminal is triggered in an implicitly triggering manner to use the parameter related to the congestion state, and once the parameter related to the congestion state is configured for the terminal, the terminal acknowledges that the terminal is in the congestion state, and the parameter related to the congestion state may be used.

In this embodiment, if the terminal is located within coverage of a base station, in another implementation of step 901, whether the terminal is in a congestion state may be determined according to received congestion state indication information. In this implementation, the terminal is triggered in an explicitly triggering manner to use the parameter related to the congestion state, and the terminal is preconfigured with the parameter related to the congestion state. Once the congestion state indication information is received, the terminal acknowledges whether the terminal is in a congestion state according to contents indicated by the indication information. And when the terminal is in a congestion state, it may use the parameter related to the congestion state.

In this embodiment, if the terminal is located out of coverage of a base station, in one implementation of step 901, whether the terminal is in a congestion state may be determined by detecting a resource utilization rate. In this implementation, the terminal is preconfigured with the parameter related to the congestion state, and may acknowledge whether the terminal is in a congestion state by detecting the resource utilization rate and comparing the resource utilization rate with a preconfigured resource utilization rate threshold.

With the method of this embodiment, the parameter related to the congestion state is configured for the terminal, thereby reducing resource collision, improving resource utilization efficiency and improving reliability of communications.

An embodiment of the present disclosure provides a computer readable program, which, when executed in an information transmission apparatus or a terminal device, will cause a computer unit to carry out the information transmission method described in Embodiment 4 in the information transmission apparatus or terminal device.

An embodiment of the present disclosure provides a computer storage medium, including a computer readable program, which will cause a computer unit to carry out the information transmission method described in Embodiment 4 in an information transmission apparatus or a terminal device.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An information transmission apparatus, configured in a terminal, the apparatus comprising:
a controller configured to determine whether the terminal is in a congestion state; and
a transmitter configured to transmit corresponding information by using a parameter related to the congestion state when the terminal is in a congestion state,
wherein the controller determines whether the terminal is in a congestion state by detecting a resource utilization rate, and
wherein the parameter related to the congestion state is a maximum number of times of transmission of a first type of information, and
a number of transmissions of the first type of information is limited by the maximum number of times of transmission of the first type of information,
wherein,
if the terminal is located out of coverage of a base station, and preconfigured with the parameter related to the congestion state,
the controller determines whether the terminal is in a congestion state by comparing the resource utilization rate with a preconfigured resource utilization rate threshold.

2. The apparatus according to claim 1, wherein, the terminal is configured with a common set of resource pools for transmitting the information.

3. The apparatus according to claim 1, wherein, the terminal is configured with multiple resource pools associated with different types of information.

4. The apparatus according to claim 3, wherein
the parameter related to the congestion state is different maximum numbers of times of transmission corresponding to different types of information; and
the transmitter is limited to the maximum numbers of times of transmission to which the different types of information corresponds in transmitting different types of information within a time period.

5. The apparatus according to claim 1, wherein the transmitter is not limited to the maximum number of times of transmission in transmitting other types of information within a time period.

6. The apparatus according to claim 1, wherein the apparatus further comprises:
a receiver configured to receive the parameter related to the congestion state; and
the controller configured to determine whether the terminal is in a congestion state according to whether the parameter related to the congestion state is received;
wherein, the terminal is located within coverage of a base station.

7. The apparatus according to claim 1, wherein the apparatus further comprises:
a receiver configured to receive congestion state indication information; and
the controller configured to determine whether the terminal is in a congestion state according to the congestion state indication information;
wherein, the terminal is located within coverage of a base station, and preconfigured with the parameter related to the congestion state.

8. An information transmission method, configured in a terminal, the method comprising:
determining whether the terminal is in a congestion state; and transmitting corresponding information by using a parameter related to the congestion state when the terminal is in a congestion state,
wherein determining whether the terminal is in a congestion state by detecting a resource utilization rate, and
wherein the parameter related to the congestion state is a maximum number of times of transmission of a first type of information, and
a number of transmissions of the first type of information is limited by the maximum number of times of the transmission of first type of information,
wherein, if the terminal is located out of coverage of a base station, and preconfigured with the parameter related to the congestion state,
determining whether the terminal is in a congestion state by comparing the resource utilization rate with a preconfigured resource utilization rate threshold.

9. The method according to claim 8, wherein, the terminal is configured with a common set of resource pools for transmitting the information.

10. The method according to claim 8, wherein, the terminal is configured with multiple resource pools associated with different types of information.

11. The method according to claim 10, wherein the terminal is limited to the maximum numbers of times of transmission to which the different types of information corresponds in transmitting different types of information within a time period.

12. The method according to claim 8, wherein the terminal is not limited to the maximum number of times of transmission in transmitting other types of information within a time period.

13. The method according to claim 8, wherein if the terminal is located within coverage of a base station, the determining whether the terminal is in a congestion state comprises:
determining whether the terminal is in a congestion state according to whether the parameter related to the congestion state is received.

14. The method according to claim 8, wherein if the terminal is located within coverage of a base station and preconfigured with the parameter related to the congestion state, the determining whether the terminal is in a congestion state comprises:
determining whether the terminal is in a congestion state according to received congestion state indication information.

15. A communications system, comprising:
a transmitter and a receiver, wherein,
the transmitter is configured to determine whether the transmitter is in a congestion state, and transmit corresponding information by using a parameter related to the congestion state when the transmitter is in a congestion state, wherein the transmitter determines whether a terminal is in a congestion state by detecting a resource utilization rate, and
wherein,
the parameter related to the congestion state is a maximum number of times of transmission of the first type of information, and
a number of transmissions of the first type of information is limited by the maximum number of times of the transmission of first type of information,
wherein if the terminal is located out of coverage of a base station, and preconfigured with the parameter related to the congestion state,
the transmitter determines whether the terminal is in congestion state by comparing the resource utilization rate with a preconfigured resource utilization rate threshold.

16. The communications system according to claim 15, wherein, the receiver is configured to transmit corresponding information by using a parameter related to the congestion state when the receiver is in a congestion state.

* * * * *